(12) United States Patent
Hennessey et al.

(10) Patent No.: US 10,117,011 B2
(45) Date of Patent: Oct. 30, 2018

(54) ADJUSTABLE HOLDER FOR A MICROPHONE ACCESSORY AND METHOD OF USE

(71) Applicant: The Music People, Inc., Berlin, CT (US)

(72) Inventors: James R. Hennessey, West Hartford, CT (US); James Robinson, Wolcott, CT (US)

(73) Assignee: The Music People, Inc., Berlin, CT (US)

( * ) Notice: Subject to any disclaimer, the term of this patent is extended or adjusted under 35 U.S.C. 154(b) by 0 days.

(21) Appl. No.: 15/407,824

(22) Filed: Jan. 17, 2017

(65) Prior Publication Data
US 2018/0206018 A1    Jul. 19, 2018

(51) Int. Cl.
  *E04G 3/00*    (2006.01)
  *H04R 1/08*    (2006.01)
  *F16M 13/02*   (2006.01)

(52) U.S. Cl.
  CPC .............. *H04R 1/08* (2013.01); *F16M 13/02* (2013.01); *F16M 2200/027* (2013.01)

(58) Field of Classification Search
  CPC .... A47G 7/044; A61G 7/0503; F16M 11/041; F16M 11/045; G10G 5/00
  USPC .............. 248/284.1, 443, 231.4; 84/327, 329
  See application file for complete search history.

(56) References Cited

U.S. PATENT DOCUMENTS

| | | | | |
|---|---|---|---|---|
| 2,920,853 A | * | 1/1960 | Bufogle | E03D 1/33 108/49 |
| 4,141,524 A | * | 2/1979 | Corvese, Jr. | A61G 7/0503 128/DIG. 26 |
| 5,368,267 A | * | 11/1994 | Howard | A47G 7/044 248/208 |
| 6,019,326 A | * | 2/2000 | Baerwolf | F16M 11/045 248/177.1 |
| 6,991,384 B1 | * | 1/2006 | Davis | F16M 11/041 248/187.1 |
| 7,134,525 B1 | * | 11/2006 | Ferris | E06C 7/486 182/107 |
| 9,075,290 B1 | * | 7/2015 | Thieman | G03B 17/561 |

* cited by examiner

*Primary Examiner* — Todd M Epps
(74) *Attorney, Agent, or Firm* — Whitmyer IP Group LLC

(57) ABSTRACT

A holder for securing a microphone having a bracket extending along a bracket axis, a mounting bar extending along a mounting bar axis, the mounting bar having a platform extending from its end, a first fastener securing the mounting bar to the bracket, the first fastener being releasable such that the mounting bar is adjustable in a direction parallel to the bracket axis when the first fastener is released and the mounting bar is fixed relative to the bracket when the first fastener is secured, an arm extending along an arm axis, a second fastener securing an end of the arm to the platform, the second fastener being releasable such that the arm is rotatable when the second fastener is released and fixed relative to the platform when the second fastener is secured, a threaded post is disposed on the arm, which can mate with a microphone accessory.

18 Claims, 8 Drawing Sheets

ADJUSTABLE HOLDER FOR A MICROPHONE ACCESSORY AND METHOD OF USE

TECHNICAL FIELD

The present disclosure relates generally to an adjustable holder for a microphone accessory and method of using the same, and more particularly to an adjustable holder having at least one rotatable arm.

BACKGROUND

Microphone accessories often need to be stabilized and positioned in front of an amplification system during concerts, during recording sessions, and in general any time a microphone accessory is placed in front of a speaker. Holders for microphone accessories often include a very large number of parts, fail to provide the necessary types of adjustment to properly position the microphone accessory, and are difficult to operate and adjust.

Aspects of the present invention are directed to these and other problems.

SUMMARY

According to an aspect of the present invention, a holder for securing a microphone accessory. The holder includes a bracket having a body extending along a bracket axis between a first end and a second end, a mounting bar having a body extending along a mounting bar axis between a first end and a second end, the mounting bar having a platform extending from the second end of the body, a first fastener securing the mounting bar to the bracket such that the mounting bar axis is generally parallel to the bracket axis, the first fastener being releasable such that the mounting bar is adjustable in a direction parallel to the bracket axis when the first fastener is released and the mounting bar is fixed relative to the bracket when the first fastener is secured, an arm having a body extending along an arm axis between a first end and a second end, a second fastener securing the first end of the arm to the platform, the second fastener being releasable such that the arm is rotatable about the mounting bar axis when the second fastener is released and the arm is fixed relative to the platform when the second fastener is secured, a threaded post disposed on the second end of the arm, the threaded post being configured to mate with a microphone accessory.

According to another aspect of the present invention, a holder for securing a microphone accessory is provided. The holder includes a bracket having a body extending along a bracket axis between a first end and a second end, an arm having a body extending along an arm axis between a first end and a second end, a fastener securing the first end of the arm body to the bracket, the fastener being releasable such that the arm is adjustable along the bracket body in a direction parallel to the bracket axis when the fastener is released and the arm is fixed relative to the bracket when the fastener is secured, the arm is rotatable about the bracket axis when the fastener is released and the arm is fixed relative to the bracket when the fastener is secured, a threaded post disposed on the second end of the arm, the threaded post being configured to mate with a microphone accessory.

According to another aspect of the present invention, a method of using a holder is provided. The method includes providing a bracket having a body extending along a bracket axis between a first end and a second end and having a support structure extending from the first end of the bracket body in a direction away from the bracket axis, a mounting bar having a body extending along a mounting bar axis between a first end and a second end, the mounting bar having a platform extending from the second end of the body in a direction away from the mounting bar axis, a first fastener securing the mounting bar to the bracket such that the mounting bar axis is generally parallel to the bracket axis, the first fastener being releasable such that the mounting bar is adjustable in a direction parallel to the bracket axis when the first fastener is released and the mounting bar is fixed relative to the bracket when the first fastener is secured, an arm having a body extending along an arm axis between a first end and a second end, a second fastener securing the first end of the arm to the platform, the second fastener being releasable such that the arm is rotatable about the mounting bar axis when the second fastener is released and the arm is fixed relative to the platform when the second fastener is secured, a threaded post is disposed on the second end of the arm. Securing the holder by wedging the support structure between a first fixed surface and a second fixed surface. Attaching a microphone accessory to the threaded post.

In addition to, or as an alternative to, one or more of the features described above, further aspects of the present invention can include one or more of the following features, individually or in combination: the arm is a first arm, and the holder further includes a second arm having a body extending along a second arm axis between a first end and a second end, a third fastener securing the first end of the second arm to the platform, the third fastener being releasable such that the second arm is rotatable about the mounting bar axis when the third fastener is released and the second arm is fixed about the mounting bar axis when the third fastener is secured. The threaded post is a first threaded post, the microphone accessory is a first microphone accessory, and the holder further includes a second threaded post disposed on the second end of the second arm, the second threaded post being configured to mate with a second microphone accessory. A threaded portion of the first threaded post is configured to mate with a threaded portion of the first microphone accessory, and a threaded portion of the second threaded post is configured to mate with a threaded portion of the second microphone accessory. The first arm axis is generally perpendicular to the mounting bar axis, and the second arm axis is generally perpendicular to the mounting bar axis. The first arm has a first track running along the first arm axis, and the first threaded post is adjustable along the first track, and the second arm has a second track running along the second arm axis, and the second threaded post is adjustable along the second track. The bracket has a support structure extending from the first end of the bracket body in a plane generally perpendicular to the bracket axis. The support structure extends in a plane generally perpendicular to the bracket axis, and the platform extends in a plane generally perpendicular to the mounting bar axis. The support structure has a flat planar bottom side, and a flat planar top side, and the holder is secured by wedging the support structure between a first object and a second object. The support structure has a compressible material fixed to at least one of the bottom side and the top side. Adjusting a height of the microphone accessory by releasing the first fastener and moving the mounting bar along the bracket body, positioning the microphone accessory by releasing the second fastener and rotating the arm about the mounting bar axis, and positioning the microphone accessory by moving the threaded post along a track that runs along the arm axis.

These and other aspects of the present invention will become apparent in light of the drawings and detailed description provided below.

DETAILED DESCRIPTION

Figure 1:
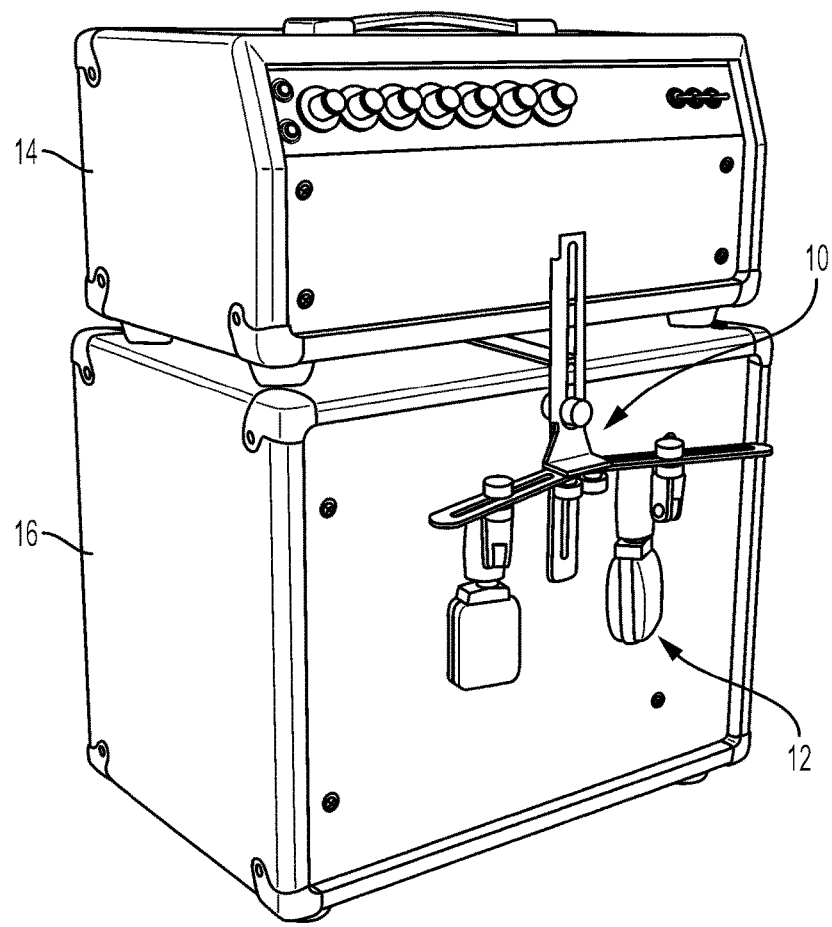
FIG. 1 illustrates a perspective view of a holder in accordance with the present disclosure mounted to an amplification system and supporting two microphone accessories.

Referring to FIG. 1, the present disclosure describes a holder 10 for a microphone accessory 12, that can be secured between a first object 14 and a second object 16.

Figure 2:
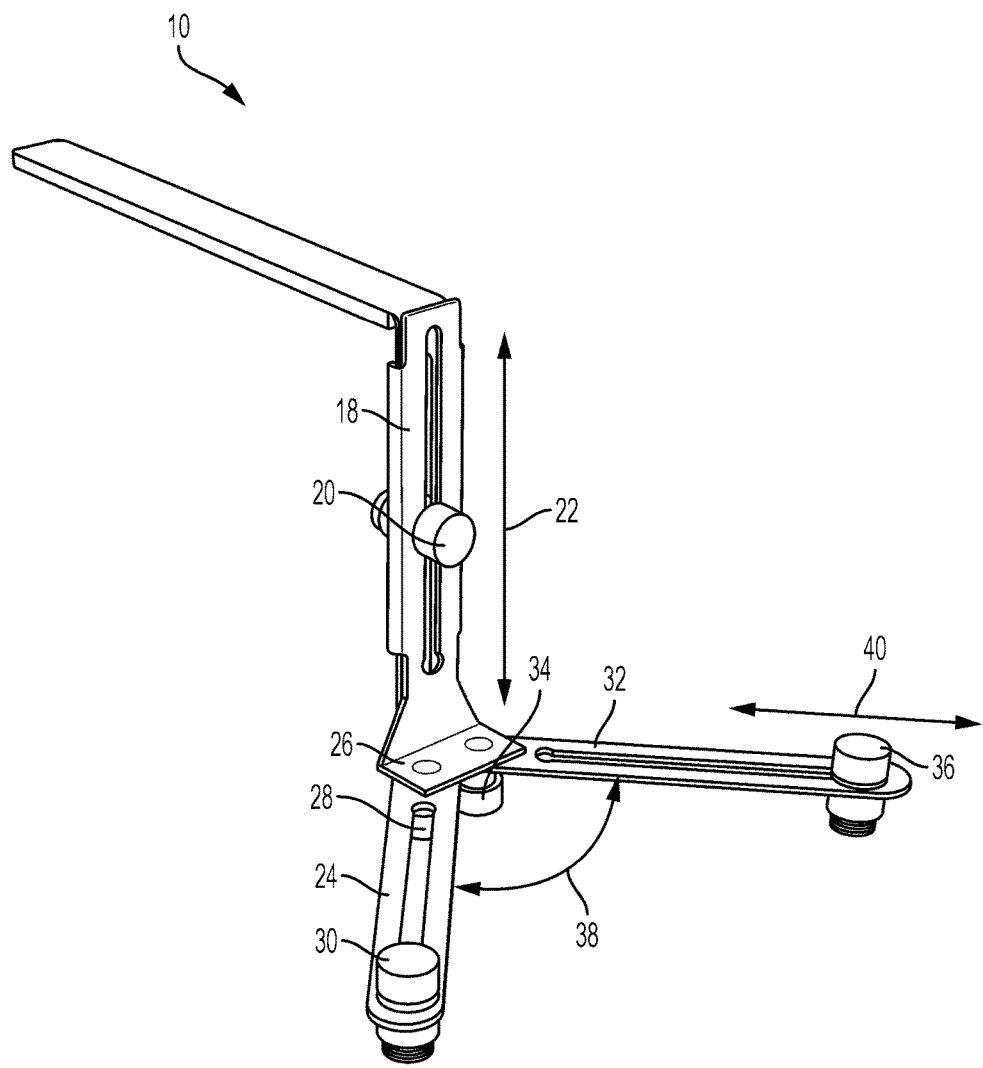
FIG. 2 illustrates a perspective view of the holder shown in FIG. 1.

Referring to FIG. 2, the holder 10 has a mounting bar 18, which has a first fastener 20. The first fastener 20 is releasable, allowing for height adjustment 22 of the mounting bar 18. A first arm 24 is attached to a platform 26 by a second fastener 28. The platform 26 extends from the mounting bar 18 is formed part of the mounting bar 18, with the portion of the mounting bar 18 that leads up to the platform 26 having a taper, adding structural integrity to the holder 10. The first arm 24 has a first threaded post 30 for attaching a microphone accessory 12. A second arm 32 is attached to the platform 26 by a third fastener 34. The second arm 32 has a second threaded post 36. The arms 24, 32 are adjustable relative to one another as shown by angular adjustment 38. The threaded posts 30, 36 are adjustable relative to one another as shown by positional adjustment 40.

Figure 3:
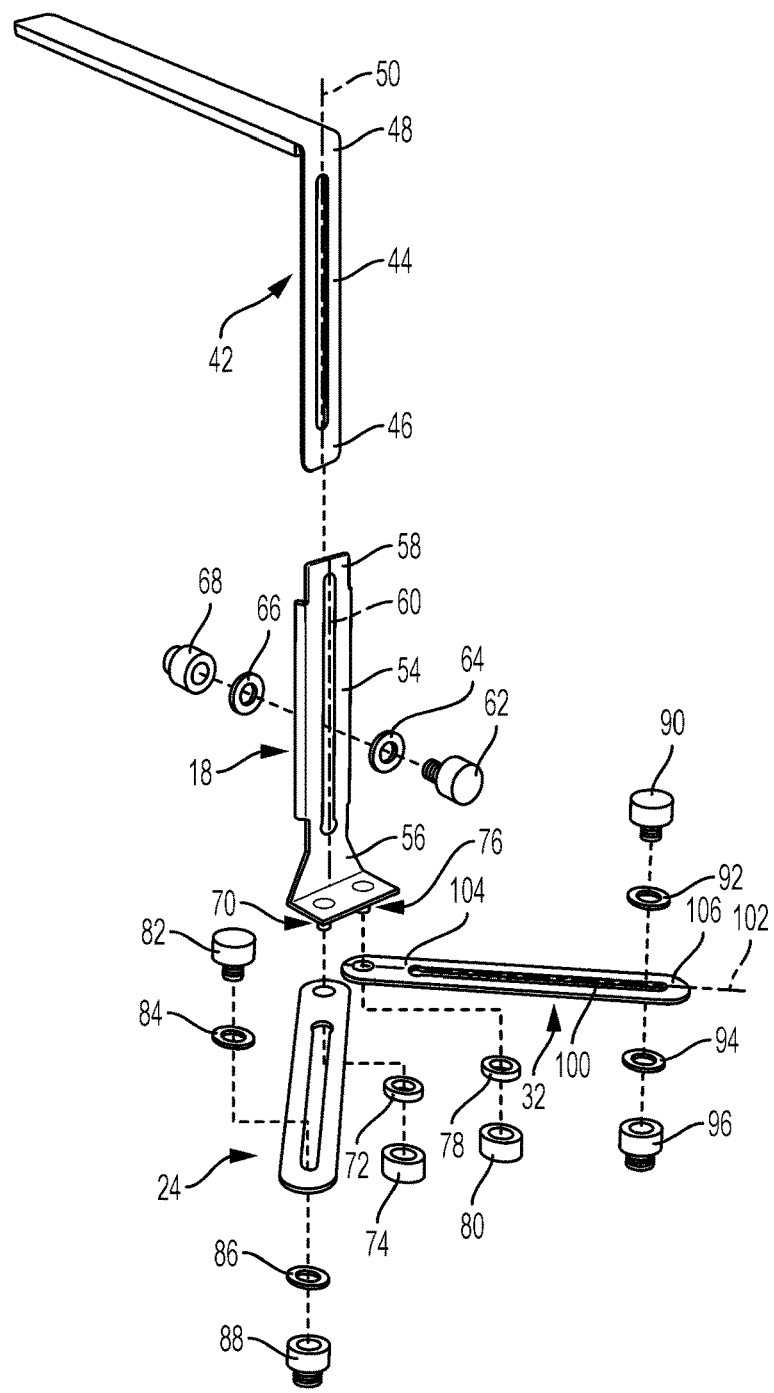
FIG. 3 illustrates an exploded perspective view of the holder shown in FIG. 1.

Referring to FIG. 3, bracket 42 has a body 44 extending from a first end 46 to a second end 48 along a bracket axis 50. Mounting bar 18 has a body 54 extending from a first end 56 to a second end 58 along a mounting bar axis 60. The components of the first fastener 20 include a bolt 62, which is inserted through a first washer 64, through the mounting bar 18, through the bracket 42, through a second washer 66, and threaded into a nut 68. The components of the second fastener 28 include a post 70, which has a first washer 72 inserted thereon, and a nut 74 threaded onto it. The components of the third fastener 34 include a post 76, which has a first washer 78 inserted thereon, and a nut 80 threaded onto it. The components of the first threaded post 30 include a bolt 82, which is inserted through a first washer 84, through the first arm 24, through a second washer 86, and threaded into a nut 88. The components of the second threaded post 36 include a bolt 90, which is inserted through a first washer 92, through the second arm 32, through a second washer 94, and threaded into a nut 96. The first arm 24 and second arm 32 have the same components, but for the sake of clarity, only the parts of the second arm 32 are shown in FIG. 3. The arms 24, 32 have a body 100 extending along an arm axis 102 between a first end 104 and a second end 106.

Figure 4A:
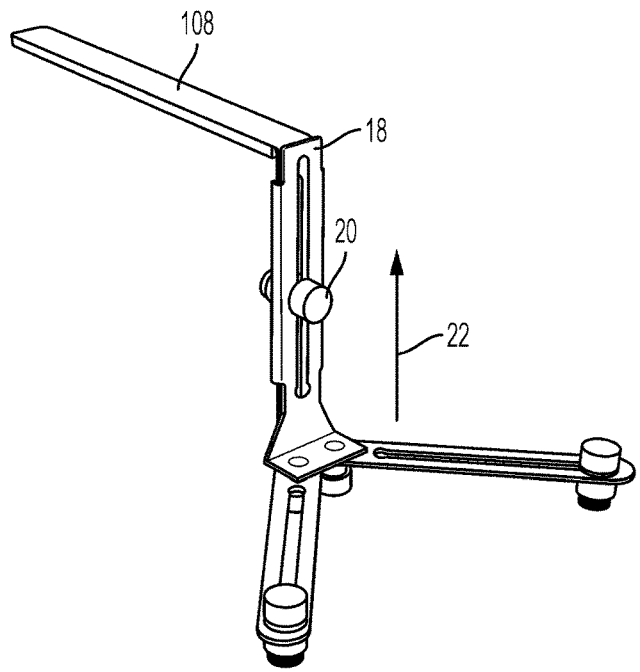
FIG. 4A illustrates a perspective view of the holder shown in FIG. 1.

Referring to FIG. 4A, the mounting bar 18 can be adjusted up and down on the bracket 42, which is held in place by the support structure 108. Before the mounting bar 18 can be adjusted as shown by the height adjustment 22 arrow, the first fastener 20 must be released, which involves partially unthreading the bolt 62 from the nut 68.

Figure 4B:
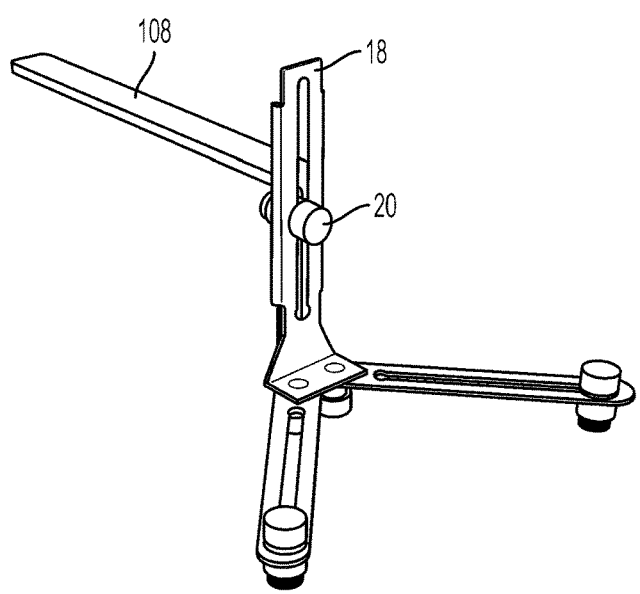
FIG. 4B illustrates a perspective view of the holder shown in FIG. 4A with the height having been adjusted.

Referring to FIG. 4B, the mounting bar 18 has been adjusted as indicated by the height adjustment 22 arrow in FIG. 4A. After the mounting bar 18 was moved or adjusted, the first fastener 20 was tightened, locking the mounting bar 18 in place relative to the bracket 42 and the support structure 108.

Figure 5A:
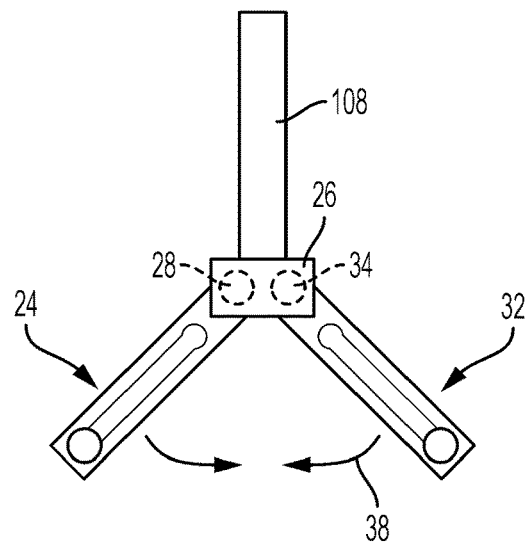
FIG. 5A illustrates a top plan view of the holder shown in FIG. 1.

Referring to FIG. 5A, the support structure 108 is holding the holder 10 in place. The second fastener 28 can be released to allow the first arm 24 to be moved relative to the platform 26 as indicated by the angular adjustment 38 arrow. The third fastener 34 can be released to allow the second arm 32 to be moved relative to the platform 26 as indicated by the angular adjustment 38 arrow.

Figure 5B:
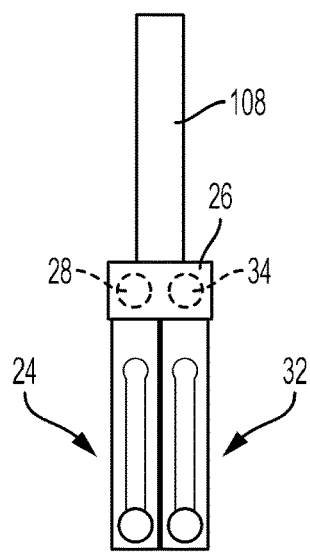
FIG. 5B illustrates a top plan view of the holder shown in FIG. 5A with the arms having been adjusted.

Referring to FIG. 5B, the first arm 24 and second arm 32 has been adjusted as indicated by the angular adjustment 38 arrows in FIG. 5A. After the arms 24, 32 were moved or adjusted, the second fastener 28 and third fastener 34 were tightened, locking the arms 24, 32 in place relative to the platform 26.

Figure 6A:
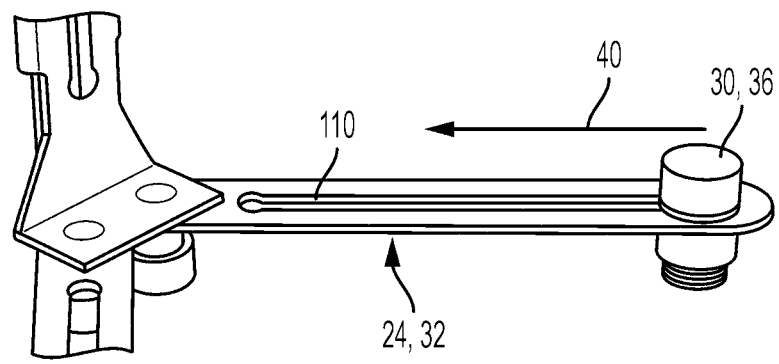
FIG. 6A illustrates a perspective view of an arm having a threaded post in accordance with the present disclosure.

Referring to FIG. 6A, a threaded post 30, 36 can be moved along a track 110 that runs along an arm 24, 32, allowing for positional adjustment 40 of the microphone accessory 12.

Figure 6B:
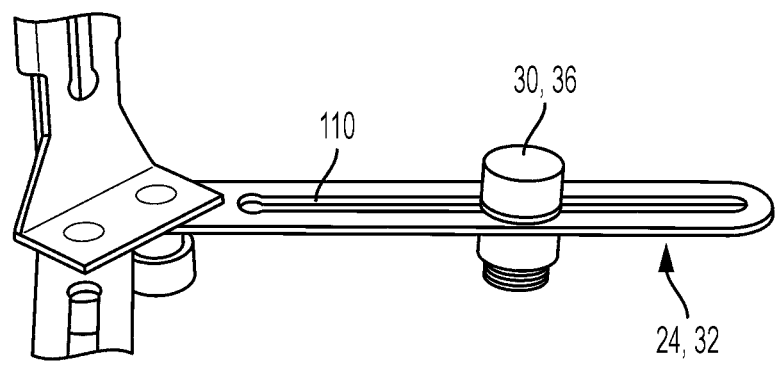
FIG. 6B illustrates a perspective view of the arm having a threaded post shown in FIG. 6A with the position of the threaded post having been adjusted.

Referring to FIG. 6B, the threaded post 30, 36 has been adjusted along the track 110 as indicated by the positional adjustment 40 arrow in FIG. 6A. After the threaded post 30, 36 was moved or adjusted, the threaded post 30, 36 was tightened, locking the threaded post 30, 36 and the microphone accessory 12 (not shown) in place.

Figure 7A:
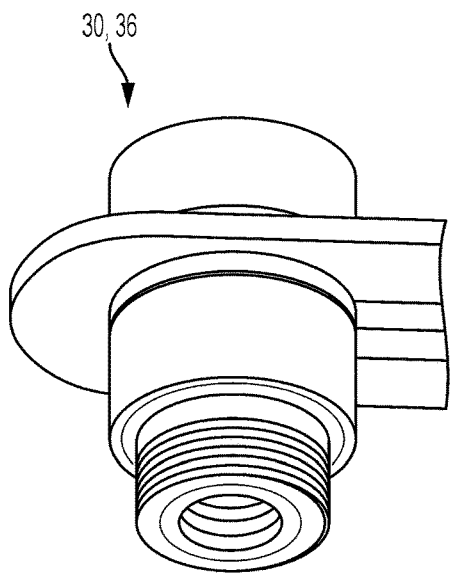
FIG. 7A illustrates a perspective view of a threaded post in accordance with the present disclosure.

Referring to FIG. 7A, the threaded post 30, 36 is fully assembled.

Figure 7B:
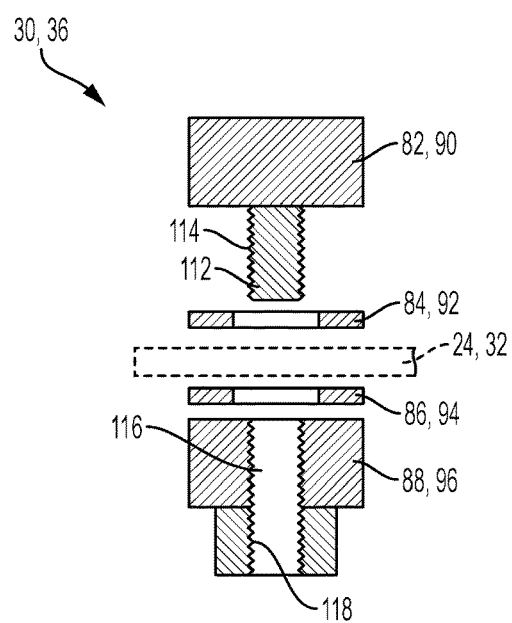
FIG. 7B illustrates an exploded front elevation cross-sectional view of the threaded post shown in FIG. 7A.

Referring to FIG. 7B, a cross-sectional exploded view of the threaded post 30, 36 shown in FIG. 7A is shown. During use of the threaded post 30, 36, the bolt 82, 90 is inserted through the first washer 84, 92, through the arm 24, 32, through the second washer 86, 94, and threaded into the nut 88, 96. The bolt 82, 90 has a post 112 extending from it, which has external threading 114. The nut 88, 96 has a bore 116 extending through it which has internal threading 118. The external threading 114 of the post 112 is configured to be inserted into the bore 116 and mate with the internal threading 118 inside the bore 116.

Figure 8A:
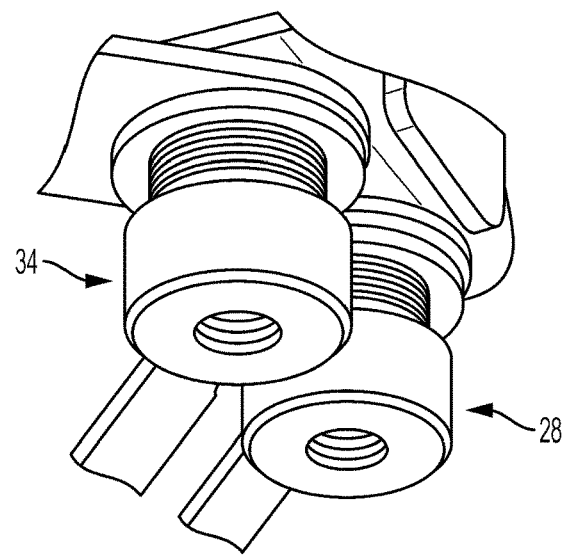
FIG. 8A illustrates a perspective view of a fastener in accordance with the present disclosure.

Referring to FIG. 8A, the second fastener 28 and third fastener 34 are fully assembled.

Figure 8B:
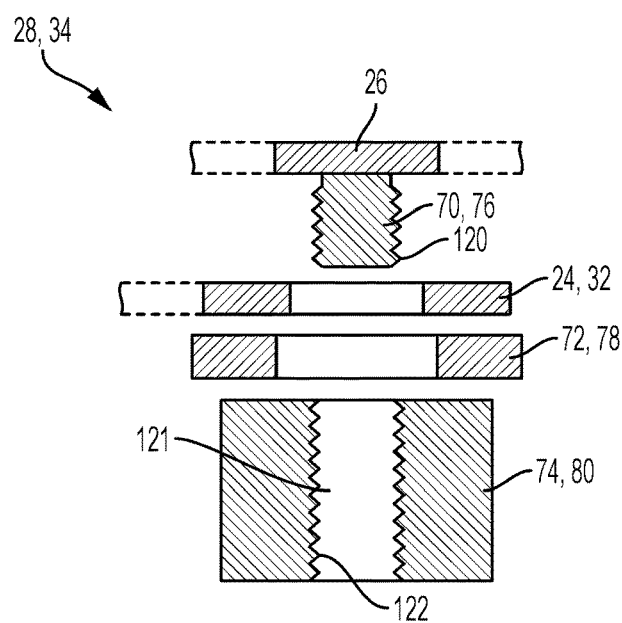
FIG. 8B illustrates an exploded front elevation cross-sectional view of the fastener shown in FIG. 8A.

Referring to FIG. 8B, a cross-sectional exploded view of the fastener 28, 34 shown in FIG. 8A is shown. During use of the fastener 28, 34, the post 70, 76 extending downward from the platform 26 has an arm 24, 32 inserted onto it, a washer 72, 78 is then inserted onto the post 70, 76, and a nut 74, 80 is threaded onto the post 70, 76. The post 70, 76 has external threading 120. The nut 74, 80 has a bore 121 extending through it which has internal threading 122. The external threading 120 of the post 70, 76 is configured to be inserted into the bore 121 and mate with the internal threading 122 inside the bore 121.

In the illustrated embodiment, a first arm 24 and a second arm 32 are shown, each having a threaded post 30, 36 attached thereto. In other embodiments of the holder 10, only a first arm 24 may be included, or several arms may be included. In either case, each arm may have any number of threaded posts attached to each arm, and the threaded post may be configured to allow any microphone accessory, or other electronic or musical accessories, to be attached thereto as known by those of skill in the art familiar with the present disclosure. In yet other embodiments, the first arm 24 is attached directly to the bracket 42 by a fastener. In this embodiment, the bracket 42 is a cylindrical rod and so one fastener can serve as a releasable adjustment mechanism for allowing the first arm 24 to both move up and down on the bracket 42, and also rotate around the bracket 42, providing height adjustment 22 and angular adjustment 38 in one mechanism. This embodiment eliminates the need for a mounting bar 18, and is a simpler and lighter construction of the holder 10. In yet other embodiments, the threaded post 30, 36 may be of any type known to those of skill in the art familiar with the present disclosure.

In the illustrated embodiment, the first fastener 20 includes a bolt 62, which is inserted through a first washer 64, through a track in the mounting bar 18, through the bracket 42, through a second washer 66, and threaded into a nut 68. When the fastener is tightened, bolt 62 is threaded into the nut 68, which squeezes the components of the fastener 20 closer together, and by squeezing the bracket 42 and the mounting bar 18 together, they are fixed relative to one another. The inner track of the mounting bar 18 and the inner track of the bracket 42 allow the bolt 62 to pass through the two components. The mounting bar 18 also has two lips extending from either side of the body 54 of the mounting bar 18, which serve to keep the mounting bar 18 aligned with the bracket 42, and prevent the bracket 42 from wiggling within the mounting bar 18, or moving out of axial alignment with the mounting bar 18. The lips of the mounting bar 18 do not interfere with the height adjustment 22 as shown in FIGS. 4A and 4B. In other embodiments, the mounting bar 18 and/or the bracket 42 can be constructed without an inner track. In such an embodiment, the fastener 20 may be designed as a clamp holding the mounting bar 18 and the bracket 42 together. In yet other embodiments, the fastener 20 may be of any type known to those of skill in the art familiar with the present disclosure.

In the illustrated embodiment, the second fastener 28 and third fastener 34 respectively serve to fix the first arm 24 and second arm 32 to the platform 26, and are arranged and function in the same fashion. For example, the components of the second fastener 28 includes a post 70, which has the first arm 24 inserted onto the post 70 through a bore in the first arm 24. The first washer 72 is inserted around the post 70, and a nut 74 is threaded onto the post 70. When the second fastener 28 is tightened, the nut 74 is rotated and threadably pulled toward the post 70, which squeezes the first arm 24 between the first washer 72 on the bottom side and the bottom surface of the platform 26 on the top side. Through this compressive force between the first arm 24 and the platform 26, the first arm 24 and the platform 26 are fixed relative to one another. In other embodiments, the second fastener 28 and third fastener 34, as well as any other fastener serving a similar function of holding an arm 24, 32 of the holder 10 in place, may be designed differently. For example, the second fastener 28 may be designed similar to the threaded post 30, 36, where instead of a post 70 extending from the bottom of the platform 26, there is a bore through the platform 26, and the second fastener 28 includes a nut and a bolt extending through the bore and securing the first arm 24 to the platform 26. In yet other embodiments, the second fastener 28 may be of any type known to those of skill in the art familiar with the present disclosure.

In the illustrated embodiment, while the holder 10 is being used, the holder 10 is secured between a first object 14, e.g. an amplifier, and a second object 16, e.g. a speaker. The top planar surface of the support structure 108 presses up against the bottom planar surface of the first object 14, and the bottom planar surface of the support structure 108 presses against the top planar surface of the second object 16, thereby wedging the support structure between the first object 14 and the second object 16, and securing the holder 10 in place. The support structure 108 is a sufficient length to also be secured by inserting the support structure 108 into or under a strap or handle, e.g. the holder 10 can be secured on top of the first object 14 if the support structure 108 were inserted into the strap shown on the top of the first object 14 in FIG. 1. In some embodiments, the support structure 108 has a compressible material fixed to its bottom surface, top surface, or both. The compressible material may be rubber, foam, or any other material known to those of skill in the art familiar with the present disclosure. The compressible material serves to mitigate vibration and increase the security of the support structure 108 between the first object 14 and the second object 16.

The holder 10 offers several advantages over other holder devices. Among other things, the holder 10 allows a microphone accessory to be positioned relative to a speaker, allowing an artist to perfect his/her personal sound and adjust the assembly according to his/her preferences.

While several embodiments have been disclosed, it will be apparent to those of ordinary skill in the art that aspects of the present invention include many more embodiments and implementations. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A holder for securing a microphone, comprising:
   a bracket having a body extending along a bracket axis between a first end and a second end;
   a mounting bar having a body extending along a mounting bar axis between a first end and a second end, the mounting bar having a platform extending from the second end of the body;
   a first fastener securing the mounting bar to the bracket such that the mounting bar axis is generally parallel to the bracket axis, the first fastener being releasable such that the mounting bar is adjustable in a direction parallel to the bracket axis when the first fastener is released and the mounting bar is fixed relative to the bracket when the first fastener is secured;
   an arm having a body extending along an arm axis between a first end and a second end;

a second fastener securing the first end of the arm to the platform, the second fastener being releasable such that the arm is rotatable about the mounting bar axis when the second fastener is released and the arm is fixed relative to the platform when the second fastener is secured;

a threaded post disposed on the second end of the arm, the threaded post being configured to mate with a microphone accessory;

wherein the arm is a first arm and the holder further comprises:

a second arm having a body extending along a second arm axis between a first end and a second end;

a third fastener securing the first end of the second arm to the platform, the third fastener being releasable such that the second arm is rotatable about the mounting bar axis when the third fastener is released and the second arm is fixed about the mounting bar axis when the third fastener is secured.

2. The holder of claim 1, wherein the threaded post is a first threaded post, the microphone accessory is a first microphone accessory, and the holder further comprises:

a second threaded post disposed on the second end of the second arm, the second threaded post being configured to mate with a second microphone accessory.

3. The holder of claim 2, wherein a threaded portion of the first threaded post is configured to mate with a threaded portion of the first microphone accessory, and a threaded portion of the second threaded post is configured to mate with a threaded portion of the second microphone accessory.

4. The holder of claim 3, wherein the first arm axis is generally perpendicular to the mounting bar axis, and the second arm axis is generally perpendicular to the mounting bar axis.

5. The holder of claim 4, wherein the first arm has a first track running along the first arm axis, and the first threaded post is adjustable along the first track; and the second arm has a second track running along the second arm axis, and the second threaded post is adjustable along the second track.

6. The holder of claim 5, wherein the bracket has a support structure extending from the first end of the bracket body in a plane generally perpendicular to the bracket axis.

7. The holder of claim 6, wherein the support structure extends in a plane generally perpendicular to the bracket axis, and the platform extends in a plane generally perpendicular to the mounting bar axis.

8. The holder of claim 7, wherein the support structure has a flat planar bottom side, and a flat planar top side, and the holder is secured by wedging the support structure between a first object and a second object.

9. The holder of claim 8, wherein the support structure has a compressible material fixed to at least one of the bottom side and the top side.

10. A holder for securing a microphone, comprising:

a bracket having a body extending along a bracket axis between a first end and a second end;

an arm having a body extending along an arm axis between a first end and a second end;

a fastener securing the first end of the arm body to the bracket, the fastener being releasable such that the arm is adjustable along the bracket body in a direction parallel to the bracket axis when the fastener is released and the arm is fixed relative to the bracket when the fastener is secured;

the arm is rotatable about the bracket axis when the fastener is released and the arm is fixed relative to the bracket when the fastener is secured;

a threaded post disposed on the second end of the arm, the threaded post being configured to mate with a microphone accessory;

wherein the arm is a first arm, the fastener is a first fastener, and the holder further comprises:

a second arm having a body extending along a second arm axis between a first end and a second end;

a second fastener securing the first end of the second arm body to the bracket such that the second arm axis is generally perpendicular to the bracket axis, the second fastener being releasable such that the second arm is adjustable along the bracket body in a direction parallel to the bracket axis when the second fastener is released and the second arm is fixed relative to the bracket when the second fastener is secured;

the second arm is pivotable about the bracket axis when the second fastener is released and the second arm is fixed relative to the bracket when the second fastener is secured.

11. The holder of claim 10, wherein the threaded post is a first threaded post, the microphone accessory is a first microphone accessory, and the holder further comprises:

a second threaded post disposed on the second end of the second arm, the second threaded post being configured to mate with a second microphone accessory;

a threaded portion of the first threaded post is configured to mate with a threaded portion of the first microphone accessory, and a threaded portion of the second threaded post is configured to mate with a threaded portion of the second microphone accessory.

12. The holder of claim 11, wherein the first arm has a first track running along the first arm axis, and the first threaded post is adjustable along the first track; and the second arm has a second track running along the second arm axis, and the second threaded post is adjustable along the second track.

13. The holder of claim 12, wherein the bracket has a support structure extending from the first end of the bracket body in a plane generally perpendicular to the bracket axis;

the first arm axis is generally perpendicular to the mounting bar axis, and the second arm axis is generally perpendicular to the mounting bar axis.

14. The holder of claim 13, wherein the support structure extends in a plane generally perpendicular to the bracket axis.

15. The holder of claim 14, wherein the support structure has a flat planar bottom side, and a flat planar top side, and the holder is secured by wedging the support structure between a first object and a second object.

16. The holder of claim 15, wherein the support structure has a compressible material fixed to at least one of the bottom side and the top side.

17. A method of using a holder, comprising steps of:

providing a bracket having a body extending along a bracket axis between a first end and a second end and having a support structure extending from the first end of the bracket body in a direction away from the bracket axis, a mounting bar having a body extending along a mounting bar axis between a first end and a second end, the mounting bar having a platform extending from the second end of the body in a direction away from the mounting bar axis, a first fastener securing the mounting bar to the bracket such that the mounting bar axis is generally parallel to the bracket axis, the first fastener being releasable such that the mounting bar is adjustable in a direction parallel to the bracket axis when the first fastener is released and the mounting bar is fixed relative to the bracket when the first fastener is secured, an arm having a body extending along an arm axis between a first end and a second end, a second fastener securing the first end of the arm to the platform, the second fastener being releasable such that the arm is rotatable about the mounting bar axis when the second fastener is released and the arm is fixed relative to the platform when the second fastener is secured, a threaded post is disposed on the second end of the arm;

securing the holder by wedging the support structure between a first fixed surface and a second fixed surface;

attaching a microphone to the threaded post.

18. The method of claim 17, further comprising:

adjusting a height of the microphone by releasing the first fastener and moving the mounting bar along the bracket body;

positioning the microphone by releasing the second fastener and rotating the arm about the mounting bar axis; and positioning the microphone by moving the threaded post along a track that runs along the arm axis.

* * * * *